(12) United States Patent
Kiddoo et al.

(10) Patent No.: US 9,371,876 B2
(45) Date of Patent: Jun. 21, 2016

(54) SYSTEMS AND METHODS FOR BRAKE SYSTEMS WITH ENGAGEMENT SENSING

(71) Applicant: Universal City Studios LLC, Orlando, FL (US)

(72) Inventors: Michael Roy Kiddoo, Orlando, FL (US); James Michael Hightower, Winter Garden, FL (US); Bradley Dwight Okeson, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 164 days.

(21) Appl. No.: 14/182,176

(22) Filed: Feb. 17, 2014

(65) Prior Publication Data
US 2015/0233439 A1 Aug. 20, 2015

(51) Int. Cl.
*G01M 17/007* (2006.01)
*F16D 66/00* (2006.01)
*B60T 17/22* (2006.01)

(52) U.S. Cl.
CPC .................. *F16D 66/00* (2013.01); *B60T 17/22* (2013.01); *F16D 2066/005* (2013.01); *F16D 2066/006* (2013.01)

(58) Field of Classification Search
CPC .................................................... G01M 17/007
USPC .................... 73/121, 128, 129, 130
See application file for complete search history.

(56) References Cited

U.S. PATENT DOCUMENTS

| | | | | |
|---|---|---|---|---|
| 3,660,815 A | * | 5/1972 | Rees | F16D 66/022 188/1.11 L |
| 3,975,706 A | * | 8/1976 | Kato | B60T 17/22 188/1.11 L |
| 4,334,428 A | * | 6/1982 | Fima | B60C 23/042 340/448 |
| 4,520,661 A | * | 6/1985 | Tamai | F16D 66/00 188/1.11 L |
| 5,970,427 A | * | 10/1999 | Greenwald | G01B 21/08 33/610 |
| 6,098,453 A | * | 8/2000 | Chodkowski | B60T 17/22 340/454 |
| 6,158,275 A | * | 12/2000 | Asao | F16D 66/024 73/121 |
| 6,276,494 B1 | | 8/2001 | Ward et al. | |

(Continued)

FOREIGN PATENT DOCUMENTS

CN 102155508 8/2011
DE 2351885 4/1975

(Continued)

OTHER PUBLICATIONS

PCT/US2015/015673 International Search Report and Written Opinion dated Nov. 24, 2015.

*Primary Examiner* — Eric S McCall
(74) *Attorney, Agent, or Firm* — Fletcher Yoder, P.C.

(57) ABSTRACT

Present embodiments relate generally to brake systems, and more specifically, to caliper-based brake systems. In an embodiment, a method includes electrifying at least a portion of a first inner surface of a first brake block with a first potential. The method also includes electrifying at least a portion of a second inner surface of a second brake block with a second potential that is different from the first potential. The method includes performing an electrical measurement between the first brake block and the second brake block, wherein the electrical measurement include a voltage measurement, a current measurement, a resistance measurement, a frequency measurement, or a combination thereof. The method further includes determining a position of the first and brake blocks relative to a brake member based on the electrical measurement.

22 Claims, 6 Drawing Sheets (56) References Cited

U.S. PATENT DOCUMENTS

| | | | |
|---|---|---|---|
| 6,302,241 B1 * | 10/2001 | Gronowicz, Jr. | B60T 17/221 188/1.11 L |
| 6,680,672 B2 * | 1/2004 | Borugian | B60T 17/221 340/449 |
| 7,165,657 B2 * | 1/2007 | Palladino | F16D 66/026 188/1.11 E |
| 7,555,375 B2 | 6/2009 | Pettersson et al. | |
| 2005/0035653 A1 | 2/2005 | Godlewsky et al. | |
| 2006/0054424 A1 | 3/2006 | Inoue et al. | |
| 2007/0052289 A1 | 3/2007 | Nilsson et al. | |
| 2010/0030490 A1 * | 2/2010 | Wright | F16D 66/02 702/34 |
| 2014/0245824 A1 * | 9/2014 | Bosis | F16D 66/02 73/129 |

FOREIGN PATENT DOCUMENTS

| | | |
|---|---|---|
| DE | 8804239 | 6/1988 |
| DE | 3813494 | 11/1989 |
| DE | 4243875 | 7/1994 |
| EP | 0174745 B1 | 3/1986 |
| EP | 2458240 A1 | 5/2012 |
| WO | 2006031933 A2 | 3/2006 |

* cited by examiner

SYSTEMS AND METHODS FOR BRAKE SYSTEMS WITH ENGAGEMENT SENSING

BACKGROUND

The present disclosure relates generally to brake systems, and more specifically, to brake sensing systems.

BRIEF DESCRIPTION

Brake systems, such as caliper-based disc brake systems, are commonly used in mechanical systems (e.g., vehicles, such as automobiles, bicycles, and trains) to retard or stop motion. For example, a disc brake of an automobile may include a pair of calipers, each having a respective brake pad, which clamp onto a brake disc (also referred to as a brake rotor) in response to a driver depressing the brake pedal of the automobile. More specifically, when the operator depresses the brake pedal of the automobile, the brake calipers may be hydraulically actuated to clamp onto the brake disc such that friction between the brake pads and the brake disc slows or stops the automobile. Subsequently, when the operator releases the brake pedal of the automobile, the brake calipers may be actuated to release the brake disc, enabling the automobile to move freely once more.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. As used herein, "along" may mean oriented relative to, such as oriented parallel to, a particular feature and is intended to include features in direct contact with one another or disposed near (e.g., proximate or adjacent) one another.

As mentioned above, brake systems (e.g., caliper-based brakes, drum brakes, etc.) are commonly used to control the motion of mechanical systems (e.g., vehicles, drilling and mining equipment, construction equipment, assembly line machinery, etc.). For example, when a brake system of a vehicle (e.g., a car, a bicycle, an amusement park ride) is applied, a particular movement of the vehicle may be restricted or prevented, which may alter the movement and/or position of the vehicle. Further, when the brake of the vehicle is released, the vehicle may once again be allowed to perform the particular movement that was restricted or prevented by the applied brake. However, apart from the impeded motion of the vehicle, it may be difficult to determine to what degree the brake mechanism has actually engaged a brake member. As used herein, a "brake member" includes a portion of the brake system that is engaged by (i.e., clamped onto, pressed against) by one or more brake blocks of the brake system. As such, as discussed herein, a brake member may include a brake disc, a brake rotor, a brake track, a brake drum, or another suitable structure. As used herein, a brake block includes a portion of the brake system that engages (i.e., contacts and clamps onto) the brake member of the brake system in response to movement of an actuator, such as an actuator of a caliper assembly of the brake system. As such, a brake block may include a brake pad, a brake shoe, or another suitable structure in accordance with embodiments of the present technique.

Accordingly, present embodiments are directed toward a brake system (e.g., caliper-based brake system) that enables electrical sensing of one or more performance parameters of the brake system during operation. For example, certain presently disclosed brake system embodiments may provide output (e.g., a measurement signal, control signal, an indicator light, or another suitable output) indicative of whether or not a the brake system is currently engaged. In certain embodiments, the disclosed brake system may also provide output indicative of an amount of force applied to the braking medium (e.g., by the caliper assembly). Additionally, in certain embodiments, the disclosed brake system may also provide output indicative of which portion of the brake member is engaged (e.g., by the caliper assembly). As discussed in detail below, such embodiments may enable positional information to be determined based, for example, on which portion of a braking member (e.g., a brake track) is engaged by a particular caliper assembly of the brake system. Furthermore, in certain embodiments, the disclosed brake system may include multiple caliper assemblies. As set forth below, such brake system embodiments may, alone or in cooperation with a control system, provide outputs indicative of whether or not each caliper assembly has engaged the braking member, an amount of force applied by each caliper assembly to the brake member, and/or an engaged position on the braking member for each caliper assembly.

Figure 1:
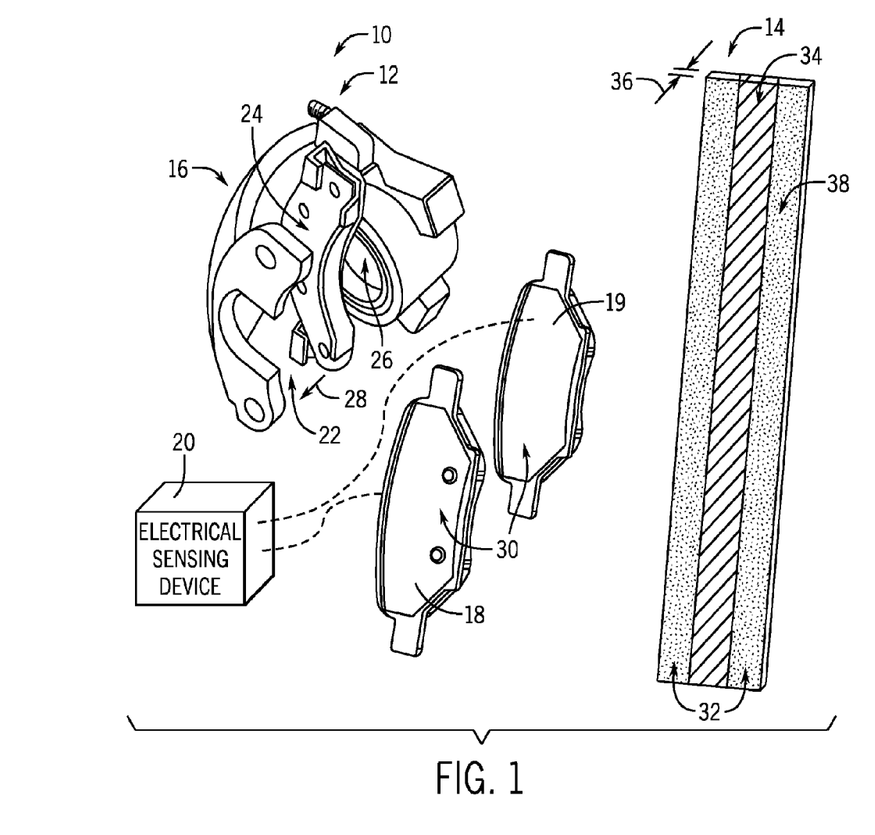
FIG. 1 is a schematic illustrating a brake system, in accordance with present embodiments.

With the foregoing in mind, FIG. 1 illustrates an example of a caliper-based brake system 10, in accordance with an embodiment of the present approach. The brake system 10 illustrated in FIG. 1 includes a caliper assembly 12 and a brake member 14. The caliper assembly 12 of the illustrated brake system 10 includes a caliper module 16, a first brake block 18, a second brake block 19, and an electrical sensing device 20. The brake blocks 18 and 19 of FIG. 1 are illustrated as being exploded out from the caliper module 16 for the purpose of discussion. During manufacture of the caliper assembly 12, the brake blocks 18 and 19 are respectively coupled or mounted to the plates 22 and 24 of the caliper module 16. The caliper module 16 also includes an actuator 26 that is configured to alter the relative positions of the brake blocks 18 and 19 in response to a stimulus. For the embodiment of the brake system 10 illustrated in FIG. 1, the actuator 26 is a hydraulically actuated piston 26 that is coupled to the plate 24 of the caliper module 16. The hydraulically actuated piston 26 is merely provided as an example and, in other embodiments, the actuator 26 may be an electrical or mechanical actuator 26 without negating the effect of the present approach.

As discussed below with respect to FIGS. 2A and 2B, the actuator 26 may, under a first stimulus (e.g., an increase in hydraulic pressure or an electrical signal) cause the actuator 26 to move the plate 24 toward the plate 22, as indicated by the arrow 28. This motion results in the brake block 19, which is coupled to the plate 24, moving toward the brake block 18, which is coupled to the plate 22. When the brake member 14 is disposed between brake blocks 18 and 19, the motion of the brake block 19 toward the brake block 18 causes the caliper assembly 12 to engage (e.g., clamp or grab onto) the brake member 14 such that the relative motion between the caliper assembly 12 and the brake member 14 is partially or completely inhibited. In other words, the frictional interaction between the inner surfaces 30 of the brake blocks 18 and 19 and the surfaces of the brake member 14 resists or prevents the brake member 14 from moving relative to the caliper assembly 12. In response to a second stimulus (e.g., a decrease in hydraulic pressure or a different electrical signal), the actuator 26 may move the plate 24 (and the coupled brake block 19) away from the plate 22 (and the coupled brake block 18), causing the brake blocks 18 and 19 to disengage (e.g., release or free) the brake member 14 such that the brake member 14 may once again move freely relative to the caliper assembly 12. In other embodiments, different mechanisms may be employed to achieve similar component interactions.

Accordingly, in certain embodiments, portions of the brake member 14 and/or portions of the inner surfaces 30 of the brake blocks 18 and 19 may be coated with a material to increase the aforementioned frictional interactions, increase toughness and durability, and/or improve the efficiency of the brake system 10. For example, in certain embodiments, braking regions 32 of the brake member 14 may be coated with a brake medium (e.g., high-friction and/or high-surface area coating) that may include ceramics, tough plastics (e.g., KEVLAR®), or other additives adhered to one or more surfaces of the brake member 14. In other embodiments, at least a portion of the inner surfaces 30 of brake block 18 and/or 19 may, additionally or alternatively, be coated with a brake medium to improve braking performance of the system 10.

Additionally, at least a portion of each of the brake blocks 18 and 19 may be electrically coupled to the electrical sensing device 20 (e.g., during manufacture of the caliper assembly 12). For example, for the illustrated brake blocks 18 and 19, the internal surfaces 30 may individually (e.g., separately) be in electrical communication with the electrical sensing device 20. In certain embodiments, the electrical sensing device 20 may be mechanically coupled to a portion of the caliper module 16 or to another suitable portion of the caliper assembly 12. Further, in some embodiments, the electrical sensing device 20 may be integral with one or both brake blocks 18 and/or 19. The electrical sensing device 20 may include any sensing circuitry capable of performing electrical measurements, such as voltage, current, resistance, and/or frequency measurements. Additionally, in certain embodiments, the electrical sensing device 20 may include processing circuitry, memory circuitry, communication circuitry, or any other suitable circuitry for performing the electrical measurements discussed below. In certain embodiments, the electrical sensing device 20 may include a voltage/current generating component that is capable of providing a bias between the brake blocks 18 and 19 while measuring a current flow between the brake blocks 18 and 19. Accordingly, the electrical sensing device 20 may be powered by a battery or may be coupled to an electrical system (e.g., a power outlet or an electrical system of a vehicle) to operate. Also, in certain embodiments, the electrical sensing device 20 may include frequency generation circuitry capable of generating an electrical current of a particular frequency (e.g., 20 hertz (Hz), 40 Hz, 60 Hz, etc.). For such embodiments, the electrical sensing device 20 may also include one or more frequency filters that may enable the electrical sensing device 20 to measure only the electrical current of one particular frequency or a particular frequency range (e.g., a 5 Hz or 10 Hz window). As discussed below, this frequency generation/filtering capability may be especially useful for addressing cross-talk issues in brake systems having more than one caliper assembly 12. In certain embodiments, a separate power source (e.g., a battery) may be electrically coupled to the brake blocks 18 and 19 (e.g., negative bias to brake block 18 and positive bias to brake block 19), and the electrical sensing device 20 may detect (e.g., measure) a flow of current between the brake blocks 18 and 19 when the brake blocks 18 and 19 are engaged with the brake member 14. In still other embodiments, a power source (e.g., a battery) may be disposed in or coupled to the brake member 14 discussed below, such that the electrical sensing device 20 may detect (e.g., measure) a flow of current between the brake member 14 and either of the brake blocks 18 or 19 when the brake blocks 18 and 19 are engaged with the brake member 14.

The brake member 14 illustrated in FIG. 1 also includes a conductive region 34 in contrast to the braking regions 32 discussed above. That is, for the illustrated embodiment of the brake system 10, braking regions 32 of the brake member 14 may generally be non-conductive either due to the insulating nature of the braking medium coating, the materials from which the portions 32 of the brake member 14 are manufactured (e.g., ceramic or polymeric), or a combination thereof. In contrast, the conductive region 34 of the braking member 14 may be made from a conductive material, such as a metal (e.g., steel, copper, nickel, etc.), that is exposed (e.g., not coated with an electrically insulating material) and is, therefore, available for contact. In other embodiments, the brake member 14 may be made completely from a conductive material (e.g., steel) and may include isolation features, discussed in greater detail below, to divide the conductive brake member 14 into conductive zones or segments.

For the embodiment illustrated in FIG. 1, it may be appreciated that the conductive region 34 extends through the width 36 of the brake member 14 such that both the front face 38 and the back face (not shown) of the braking member has an exposed conductive region 34 available for contact. In other words, the conductive region 34 provides a conductive pathway through the width 36 of the brake member 14. In some embodiments, the conductive region 34 includes a layer of conductive material that is electrically coupled to one or more vias (e.g., passages filled with conductive material) that pass through the body of the brake member 14 to provide electrical coupling with a layer of conductive material on the back face that defines another conductive region 34. Further, in certain embodiments, it may be appreciated that the front face 38 and back face (not shown) of the brake member 14 may be substantially flat (e.g., the brake member 14 has a uniform width across the portions 32 and the conductive region 34). That is, after the brake medium-coated onto the braking regions 32 of the brake member 14, the thickness 36 of the braking regions 32 and the conductive region 34 may be substantially the same.

Figure 2A:
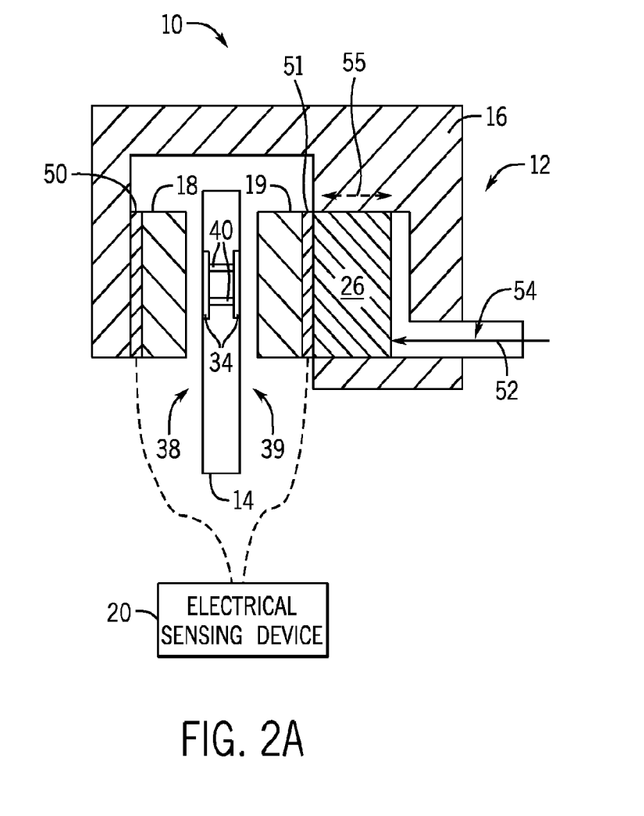
FIG. 2A is a schematic illustrating the brake system in a disengaged or open position, in accordance with present embodiments.
Figure 2B:
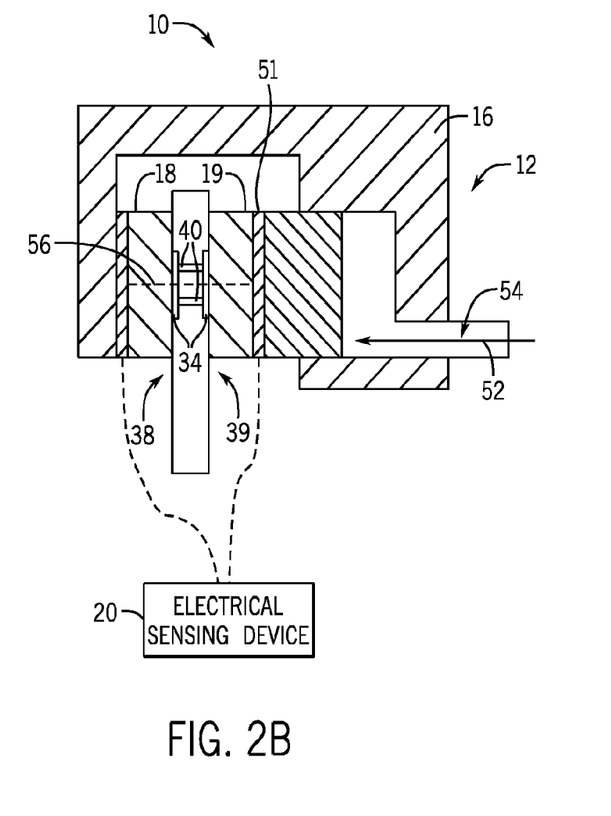
FIG. 2B is a schematic illustrating the brake system in an engaged or closed position, in accordance with present embodiments.

FIGS. 2A and 2B are schematic cross-sectional views of the embodiment of the brake system 10 illustrated in FIG. 1. In particular, FIG. 2A illustrates the brake system 10 in a disengaged (e.g., open) position, while FIG. 2B illustrates the brake system 10 in and engaged (e.g., closed) position. As discussed above, the brake system 10 includes the caliper assembly 12 and the brake member 14, which is positioned within an opening or orifice of the caliper assembly 12. The caliper assembly 12 illustrated in FIGS. 2A and 2B includes the caliper module 16, the actuator 26 (e.g., a hydraulically actuated piston 26), and the brake blocks 18 and 19. It may be appreciated that the brake member 14 is oriented such that the conductive regions 34 on the front face 38 and back face 39 of the brake member 14 (as illustrated in FIG. 1) are now facing the brake blocks 18 and 19 in FIGS. 2A and 2B, respectively. It should be noted that the vias 40 illustrated as communicatively coupling (e.g., electrically coupling) the conductive regions 34.

Additionally, the embodiment of the brake system 10 illustrated in FIGS. 2A and 2B includes mounting devices 50 and 51, which mechanically mount the brake blocks 18 and 19 to the caliper module 16, respectively. That is, the mounting device 50 may assume the role the plate 22, and mounting device 51 may assume the role of plate 24, discussed above in FIG. 1 while also providing enhanced functionality. Other embodiments of the brake system 10 may include only one mounting device (e.g., use a single mounting device 50 in combination with a plate 24, as discussed in FIG. 1). As illustrated in FIGS. 2A and 2B, in certain embodiments, the mounting devices 50 and 51 are individually electrically coupled to the electrical sensing device 20. Furthermore, in certain embodiments, the mounting devices 50 and 51 are continually in electrical communication or contact with their respective mechanically coupled brake blocks 18 and 19. However, in other embodiments, the mounting devices 50 and 51 may be pressure sensitive switches that only provide respective conductive paths between the electrical sensing device 20 the brake blocks 18 and 19 when the mounting devices 50 and 51 are compressed (e.g., when the brake system 10 is engaged, as illustrated in FIG. 2B). For example, in certain embodiments, the mounting devices 50 and 51 may include a conductive spring element (e.g., a Belleville or crush washer) that only forms a conductive path through the mounting devices 50 and 51 when the conductive spring element is compressed (e.g., when the applied force by the actuator 26 exceeds the spring force of the spring element). It may be appreciated that, as used herein, a conductive spring element may be entirely conductive or may include both conductive and non-conductive components, so long as a conductive path is formed through the conductive spring element when it is compressed beyond a particular threshold (e.g., compressed by a force greater than a threshold force).

By further example, in certain embodiments, the mounting devices 50 and 51 may include a dynamic electrical material whose conductivity (e.g., resistivity) may be a function of the force applied by the action of the actuator 26 (e.g., in response to the force 52 applied to the hydraulic piston 26 by the hydraulic fluid 54). Examples of such dynamic electrical materials include piezoelectric materials (e.g., piezoresistive materials, such as silicon or polysilicon), which may provide a different resistance (e.g., a lower resistance, a higher conductivity) when compressed by the motion 55 of the actuator 26. Furthermore, in certain embodiments, the mounting devices 50 and 51 may also function to electrically isolate the brake blocks 18 and 19 from the remainder of the caliper module 16. That is, in certain embodiments, regardless of whether or not the caliper assembly 12 is engaged (as illustrated in FIG. 2B) or is disengaged (as illustrated in FIG. 2A), the mounting devices 50 and 51 may not allow electrical current to flow between the electrical sensing device 20 and any portion of the caliper module 16 other than the brake blocks 18 and 19.

With the foregoing in mind, FIG. 2A illustrates that, for the brake system 10 in the disengaged position, a completed electrical circuit is not formed through the brake member 14 (i.e., through the conductive region 34 of the brake member 14 illustrated in FIG. 1). That is, while the brake blocks 18 and 19 may be individually biased by the electrically coupled electrical sensing device 20, the brake blocks 18 and 19 are not in physical and electrical contact with the brake member 14. Accordingly, the electrical sensing device 20 is able to sense or determine that the caliper assembly 12 is not currently engaged with the brake member 14. Specifically, because there is no electrical coupling between brake blocks 18 and 19, the electrical sensing device 20 can essentially confirm this disengaged position. As set forth below, in certain embodiments, the electrical sensing device 20 may provide an output (e.g., a warning light, an alarm, a signal to a controller or a control system) in response to sensing or determining that the caliper assembly 12 is not engaged with the brake member 14.

In contrast, FIG. 2B illustrates that, for the brake system 10 in the engaged position, a completed electrical circuit (illustrated by the dashed line 56) is completed through the braking member 14 (i.e., through the conductive region 34 of the brake member 14 illustrated in FIG. 1). That is, the brake blocks 18 and 19 are individually biased by the electrically coupled electrical sensing device 20, and the brake blocks 18 and 19 are in physical and electrical contact with the brake member 14. Accordingly, the electrical sensing device 20 is able to sense or determine that the caliper assembly 12 is currently engaged with the brake member 14. As set forth below, in certain embodiments, the electrical sensing device 20 may provide an output (e.g., a warning light, an alarm, a signal to a controller or a control system) in response to sensing or determining that the caliper assembly 12 is engaged with the brake member 14. It may be appreciated that, for embodiments in which the mounting devices 50 and 51 are configured to only provide respective conductive paths between the brake blocks 18 and 19 and the electrical sensing device 20 when compressed by a sufficiently large force, the completed circuit represented by the dashed line 56 may only be formed when the force 52 applied by the actuator 26 is sufficiently large to compress the conductive spring element. Thus, the electrical sensing device 20 may also provide output indicative of a magnitude of the force 52. Furthermore, for embodiments in which the mounting devices 50 and 51 include a dynamic electrical material, the conductivity of the completed circuit represented by the dashed line 56 may be a function of the force applied by the actuator 26. For example, the electrical circuit represented by the dashed line 56 may have a higher resistance when the pressure applied by the actuator 26 is lower, and may have a lower resistance when the pressure applied by the actuator 26 is higher. As set forth below, in certain embodiments, the electrical sensing device 20 may then provide an output (e.g., a signal to a controller or a control system) based on the measured conductivity of the completed circuit 56 as an indication of how much force is being applied by the actuator 26. Regardless of the nature of the mounting devices 50 and 51, the completed electrical circuit 56 may be broken once one or both brake blocks 18 and 19 lose physical and electrical contact with the brake member 14.

Figure 3:
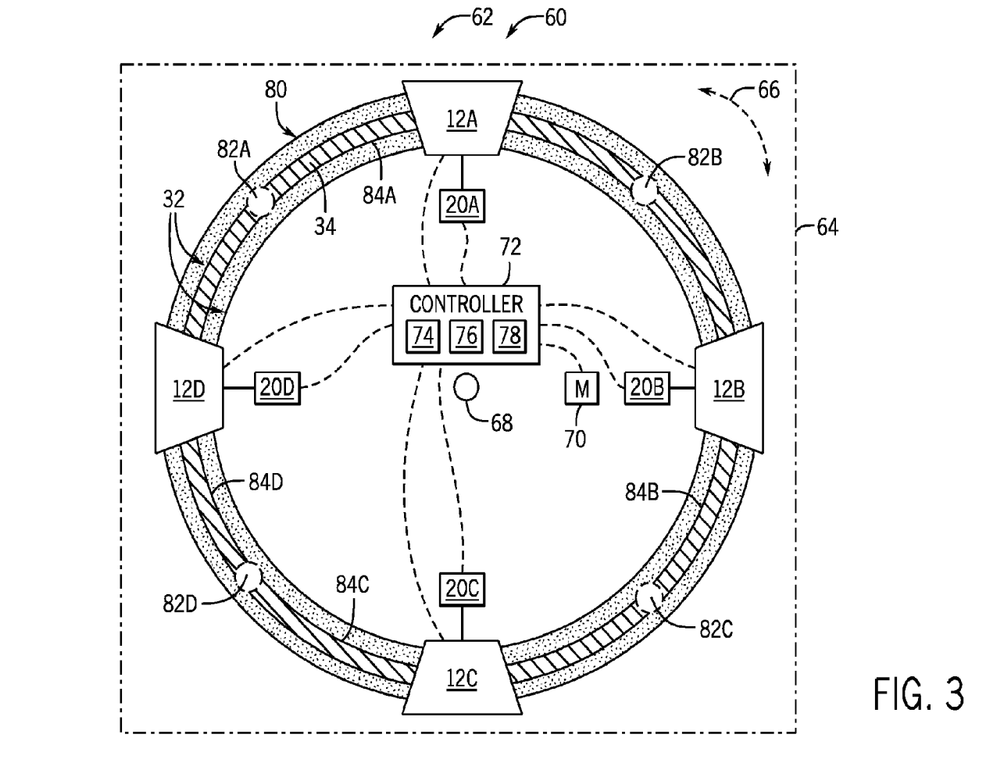
FIG. 3 is a schematic illustrating an embodiment of a rotating platform system including a brake system having multiple caliper assemblies, in accordance with present embodiments.

FIG. 3 is a schematic illustrating an embodiment of a rotating platform system 60 that includes an embodiment of a brake system 62 having more than one caliper assembly 12. The rotating platform system 60 includes a platform 64 that is configured to rotate 66 about a central bearing mechanism 68. Additionally, the rotating platform system 60 includes at least one drive motor 70 that is able to rotate 66 the platform 64 about the central bearing mechanism 68 based on control signals provided by a controller 72. The controller 72 is an electronic device that includes processing circuitry 74, memory circuitry 76, and communication circuitry 78, wherein the processing circuitry 74 is configured to execute one or more instructions stored in the memory circuitry 76 to control operations of the rotating platform system 60, including the brake system 62. In other embodiments, the controller 72 may be a component of the brake system 62. In certain embodiments, the brake member 80 may rotate 66 (along with the rotation 66 of the platform 64) relative to caliper assemblies 12; while in other embodiments, the caliper assemblies 12A-D (e.g., 12A, 12B, 12C, 12D) may rotate 66 (along with the rotation 66 of the platform 64) relative to the brake member 80.

The embodiment of the brake system 60 illustrated in FIG. 3 includes four caliper assemblies 12A-D disposed about a circular brake member 80. Each caliper assembly 12A-D is electrically coupled to a respective electrical sensing device 20A-D (e.g., 20A, 20B, 20C, 20D) as set forth above with respect to FIGS. 1, 2A, and 2B. As illustrated in FIG. 3, in addition to the drive motor 70, the controller 72 may be communicatively coupled (e.g., via a wired or wireless communication interface) to each of the caliper assemblies 12A-D as well as each of the electrical sensing devices 20A-D. For example, the caliper assemblies 12A-D illustrated in FIG. 3 may be individually electrically actuated (e.g., using electrical actuators 26) based on control signals received from the controller 72. Further, the controller 72 may receive communication signals individually from the electrical sensing devices 20A-D, which may be used by the controller 72 to determine whether or not each caliper assembly 12A-D is engaged with the brake member 80, to determine an amount of force applied by each caliper assembly 12A-D onto the brake member 80, and/or a location of each caliper assembly 12A-D relative to the brake member 80.

Like the brake member 14 set forth in FIG. 1, the circular brake member 80 illustrated in FIG. 3 includes braking regions 32 in addition to a conductive region 34, which extends through the width of the brake member 80. Accordingly, as set forth above, when a particular caliper assembly (e.g., caliper assembly 12A) sufficiently engages the brake member 80, a conductive path may be formed through the conductive region 34 of the brake member 80, and the corresponding electrical sensing device 20A may sense or determine that the particular caliper assembly 12A is engaged. Additionally, the brake member 14 includes a number of isolation features 82A-D (e.g., 82A, 82B, 82C, 82D), which respectively isolate or segmented the conductive region 34 of the brake member 80 into conductive segments 84A-D (e.g., 84A, 84B, 84C, 84D). The isolation features 82A-D illustrated in FIG. 3 are circular isolation features, which may represent a portion of the brake member 14 that has been removed (e.g., drilled or tapped) in order to electrically isolate the conductive segments 84A-D from one another. In other embodiments, the isolation features 82A-D may be rectangular, square, hexagonal, or any other suitable shape. In still other embodiments, the isolation features 82A-D may be filled with a non-conductive material (e.g., an insulating polymer or a brake medium) configured to electrically isolate the conductive segments 84A-D of the brake member 80 from one another. It may be appreciated that the isolation features 82A-D may be wide relative to conductive aspects of the brake blocks (e.g., brake blocks 18 and 19 as well as other embodiments of brake blocks discussed below) to prevent potential electrical coupling (e.g., shorting) between respective conductive segments 84A-D via an engaged brake block.

For the illustrated embodiment of the brake system 62, the isolation features 82A-D can be utilized to address issues associated with cross-talk that may arise in a brake system having multiple caliper assemblies 12A-D. That is, it may be appreciated that, for the illustrated brake system 62, in the absence of the isolation features 82A-D, a cross-talk situation could potentially arise in which a completed circuit might form along the conductive region 34 of the brake member 80 between two different caliper assemblies (e.g., between caliper assembly 12A and caliper assembly 12B). Such a cross-talk situation could result in one or more electrical sensing devices 20A-D incorrectly sensing or determining that its respective caliper assembly 12A-D is engaged with the brake member 80. Accordingly, isolation features 82A-D ensure that each caliper assembly 12A-D is disposed along a different respective electrically isolated conductive segment 84A-D along the brake member 80, which obviates the potential cross-talk situation. In other embodiments, each electrical sensing device 20A-D may use a different frequency of electrical current (e.g., electrical sensing device 20A uses 20 Hz, electrical sensing device 20B uses 40 Hz, electrical sensing device 20C uses 60 Hz, etc.) through a non-segmented conductive region 34 of the brake member 80. For such embodiments, each electrical sensing device 20A-D may use a frequency filter to ensure that the amount of current measured corresponds to the correct current frequency or current frequency range. That is, in certain embodiments, the frequency filter of electrical sensing device 20A may ensure that the electrical frequency (or range of electrical frequencies) applied to the caliper assembly 12A matches the electrical frequency or frequency range measured by the electrical sensing device 20A to avoid cross-talk with other caliper assemblies 12B, 12C, and 12D. As used herein, a "matching frequency" may be used to describe the applied electrical frequency being exactly the same as or substantially the same as (e.g., within a tolerance of approximately 2 Hz, 5 Hz or, 10 Hz) the measured electrical frequency. As such, non-matching electrical frequencies may be filtered and/or discarded to avoid cross-talk between the caliper assemblies 12A-D.

FIGS. 4-7 illustrate various embodiments of brake blocks that, in combination with various braking members discussed below, may enable additional features (e.g., positional information, redundancy, efficiency determinations, and maintenance determinations) for the disclosed braking systems 10 and 60. For the brake blocks 18 and 19 discussed above with respect to FIG. 1, the entire inner surfaces 30 may be electrically coupled to the electrical sensing device 20. However, for the brake block embodiments illustrated in FIGS. 4-7, only particular portions of the brake block may be electrically coupled to the electrical sensing device 20. That is, in certain embodiments, the brake block embodiments illustrated in FIGS. 4-7 may include conductive regions (e.g., metallic conductive regions) as well as non-conductive regions. In certain embodiments, the non-conductive regions may be made from a non-conductive material (e.g., a non-conductive ceramic, polymer, or composite material) that may or may not be coated with a non-conductive coating (e.g., a non-conductive brake medium). Further, the conductive regions and the non-conductive regions may be substantially flush with one another, providing a relatively uniform or flat surface for braking. It may be appreciated that, since the brake blocks are used as a matched pair, a brake block pair for a brake block illustrated in FIGS. 4-7 may have the illustrated features disposed in an arrangement that is a mirror image or a reflection of the illustrated brake block.

Figure 4:
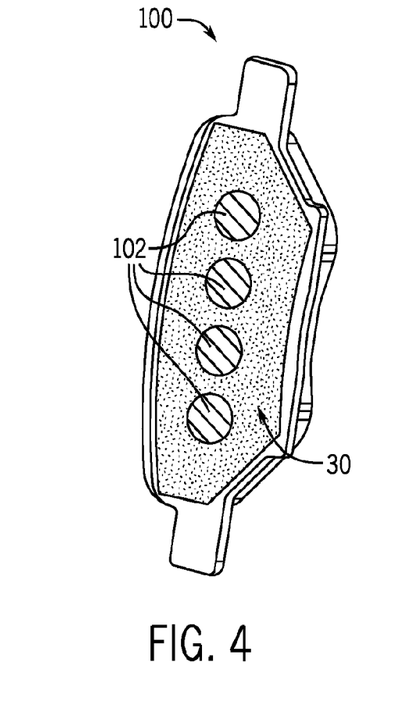
FIGS. 4-7 are schematics illustrating various brake blocks of the disclosed brake system, in accordance with present embodiments.
Figure 5:
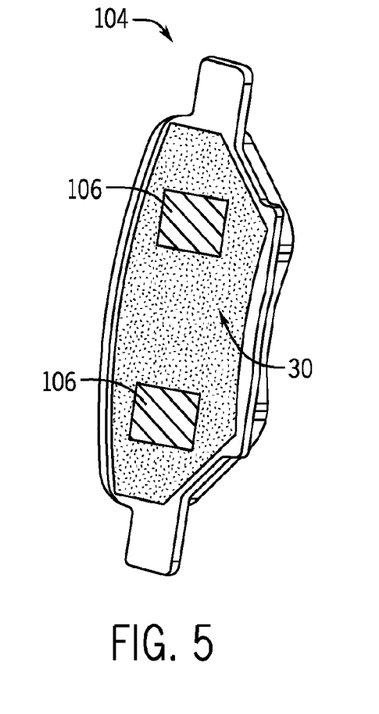

With the foregoing in mind, FIG. 4 illustrates an embodiment of a brake block 100 having an inner surface 30 that includes four circular conductive regions 102, while the remainder of the inner surface 30 is substantially non-conductive. Accordingly, the brake block 100 illustrated in FIG. 4 may only pass current through the conductive regions 102 when the conductive regions 102 are in contact with the conductive region 34 of a brake member 14 or 80. Similarly, FIG. 5 illustrates another embodiment of a brake block 104 that includes two rectangular conductive regions 106, while the remainder of the inner surface 30 is substantially non-conductive. Accordingly, the brake block 104 illustrated in FIG. 5 may only pass current through the conductive regions 106 when in contact with the conductive region 34 of the braking member 14 or 80. The shape and arrangement of these conductive regions (e.g., conductive regions 102 and 106) may be coordinated with the shape and arrangement of isolation features (e.g., isolation features 82, discussed above, as well as other isolation features discussed below) to ensure isolation of different conductive segments of the brake member (e.g., brake member 80 illustrated in FIG. 3).

It may be appreciated that brake block embodiments 100 and 104, as well as other embodiments discussed below, may enable the construction of a brake system in which the completed electrical circuit may be formed from a between two or more conductive regions (e.g., conductive regions 102 or 106) of the same brake block when the conductive regions of the brake block are in electrical contact with the conductive region of the brake member. This forms a completed electrical circuit allowing the electrical sensing device 20 to sense or determine that the caliper assembly 12 has engaged the brake member 14. For such embodiments, advantages include only using only one brake block with conductive regions (e.g., the other brake block in the may be a standard brake block or a non-conductive brake pad) and the conductive region of the brake member (e.g., conductive region 34 of the brake member 14) need not extend all the way through the width of the brake member since only electrical contact is only made with one side of the brake member 14. It may be appreciated by one of ordinary skill in the art that, for embodiments of drum brakes in accordance with the present approach, a brake shoe may be manufactured having two or more conductive regions, like the conductive regions 102 or 106 of the brake blocks 100 and 104. For such embodiments, a completed electrical circuit may be formed between the first conductive region of the brake shoe, a conductive brake drum (e.g., a conductive brake member), and a second conductive region of the brake shoe whenever the brake shoe is in contact with the conductive brake drum.

Figure 6:
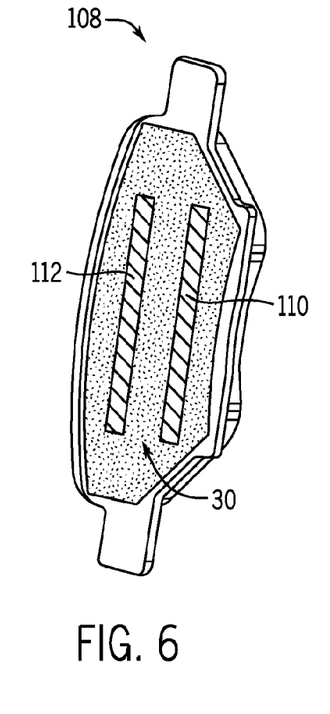
Figure 7:
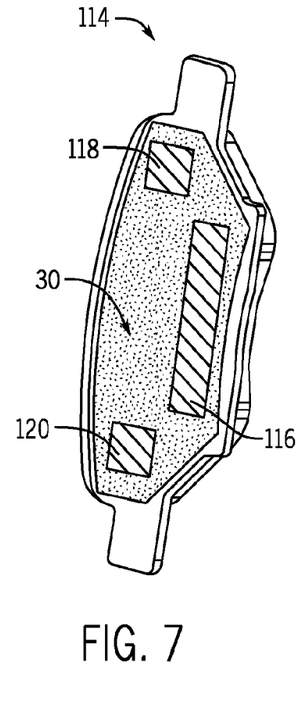

FIGS. 6 and 7 also illustrate embodiments of brake blocks that have particular conductive regions. For example, as discussed in detail below with respect to FIGS. 10-15, in certain embodiments a brake member may include two or more conductive regions or stripes. As such, the brake block embodiments illustrated in FIGS. 6 and 7 are able to individually contact at least two different conductive regions of a brake member. As discussed in greater detail below, this may enable the disclosed brake systems 10 and 62 to determine a position of a caliper assembly relative to the brake member.

In particular, FIG. 6 illustrates an embodiment of a brake block 108 having a first rectangular conductive region 110 and a second rectangular conductive region 112, while the remainder of the inner surface 30 is substantially non-conductive. In certain embodiments, the conductive region 110 and the conductive region 112 may be individually coupled to the electrical sensing device 20 such that the conductive region 110 and the conductive region 112 may be used by the electrical sensing device 20 to perform two separate sensing or measurement operations. For example, the electrical sensing device 20 may apply a first electrical signal (e.g., a first voltage and/or frequency) to the conductive region 110 and may apply a second electrical signal (e.g., a second voltage and/or frequency) to the conductive region 112. As set forth in detail below with respect to FIGS. 10-15, for embodiments of the brake member that include multiple conductive regions, the conductive region 110 may form a portion of a first electrical circuit through the brake member, while the conductive region 112 may form a portion of a second, distinct electrical circuit through the brake member. As discussed in detail below, an electrical sensing device 20 or the controller 72 may determine a position of a caliper assembly 12 relative to the brake member 14 or 80 based on the electrical signals (e.g., an absence or presence of current, or an amount of current) traversing the conductive region 110 and 112, respectively.

Similarly, FIG. 7 illustrates an embodiment of a brake block 114 having a rectangular conductive region 116, a first square conductive region 118, and a second square conductive region 120, while the remainder of the inner surface 30 may be substantially non-conductive. In certain embodiments, the conductive regions 116, 118, and 120 may be separately coupled to the electrical sensing device 20 such that the conductive regions 116, 118, and 120 may be used by the electrical sensing device 20 to perform to separate sensing or measurement operations. For example, the electrical sensing device 20 may apply a first electrical signal (e.g., a first voltage and/or frequency) to the conductive region 116, may apply a second electrical signal (e.g., a second voltage and/or frequency) to the conductive region 118, and may apply a third electrical signal (e.g., a third voltage and/or frequency) to the conductive region 120. As set forth below with respect to FIGS. 10-15, for embodiments of the brake member that include multiple conductive regions, each conductive region 116, 118, and 120 may form portions of distinct electrical circuits through the brake member, which may be used to determine a position of a caliper assembly 12 relative to the brake member 14 or 80 based on the electrical signals (e.g., an absence or presence of current, or an amount of current) traversing the conductive regions 116, 118, and 120, respectively.

FIGS. 8-15 illustrate different embodiments of a brake member that may be used in certain embodiments of the brake system 10 or 62. While the brake members illustrated in FIGS. 8-15 are illustrated as being straight, in certain embodiments, the brake members may be curved (e.g., like the brake member 80 of FIG. 3). It may also be appreciated that certain brake member embodiments set forth in FIGS. 8-15 may be used in combination with any of the brake block embodiments (e.g., brake blocks 18, 100, 104, 108, and/or 114) set forth above.

Figure 8:
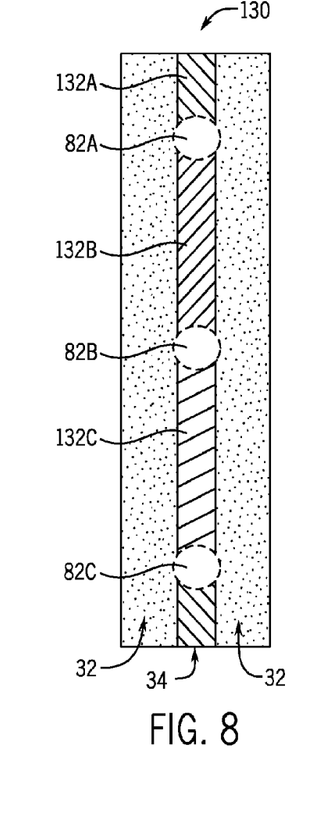
FIGS. 8-15 are schematics illustrating various brake members of the disclosed brake system, in accordance with present embodiments.

With the foregoing in mind, FIG. 8 illustrates an embodiment of a brake member 130. Like the brake members 14 and 80 discussed above, the brake member 130 includes a conductive region 34 as well as non-conductive or braking regions 32. However, for the brake member 130 illustrated in FIG. 8, the conductive region 34 is broken into conductive segments 132A, 132B, and 132C by the isolation features 82A, 82B, and 82C, respectively. Furthermore, each of the conductive segments 132A, 132B, and 132C of the illustrated brake member 130 are made from a different conductive material having a different conductivity or resistivity. For example, conductive segment 132A may be made from a first conductive material (e.g., steel) having a first conductivity or resistance, the conductive segment 132B may be made from a second conductive material (e.g., copper) having a second conductivity or resistance, and so forth. As such, for a braking system having multiple caliper assemblies (e.g., the braking system 62 illustrated in FIG. 3), in addition to electrically isolating the conductive segments 132A-C (e.g., to prevent cross-talk), the brake member 130 may enable the electrical sensing device 20 and/or the controller 72 to determine with which conductive segment a particular caliper assembly is presently engaged based on the measured current traversing the conductive segment based on the known conductivity or resistance of the conductive materials. For example, if the electrical sensing device 20 and/or the controller 72 determines an amount of current traversing an engaged caliper assembly 12 corresponds to a conductivity or resistance of a particular material (e.g., steel), then the electrical sensing device 20 and/or the controller 72 may determine that the caliper assembly 12 is engaged with the conductive segment 132A (e.g., which is made from steel).

Figure 9:
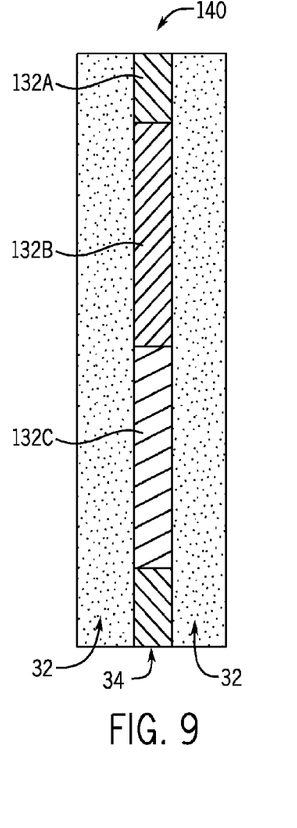

The brake member embodiment 140 illustrated in FIG. 9 is similar to the brake member embodiment 130 illustrated in FIG. 8; however, the brake member 140 illustrated in FIG. 9 does not include the isolation features 82A-C. As such, for brake system embodiments having more than one caliper assembly 12, the brake member embodiment 140 illustrated in FIG. 9 may be used in combination with cross-talk solutions that do not involve isolation features 82A-C (e.g., frequency-based isolation, as discussed above). For brake systems involving the use of a single caliper assembly 12, the conductivity or resistance measured by the electrical sensing device 20 for the engaged caliper may be used to determine with which conductive segment 132A, 132B, or 132C the caliper assembly 12 is presently engaged.

Figure 10:
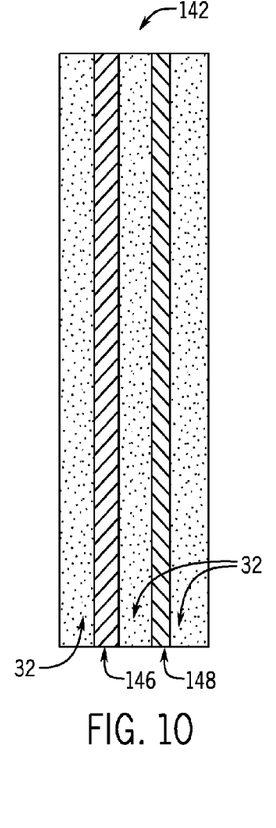
Figure 11:
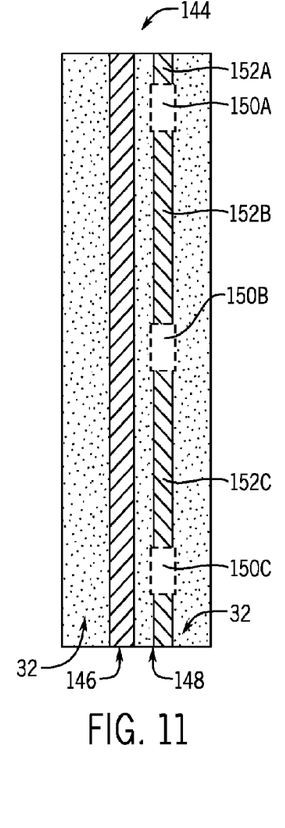

FIGS. 10 and 11 respectively illustrate brake member embodiments 142 and 144. The brake member embodiments 142 and 144 illustrated in FIGS. 10 and 11 include two separate and distinct conductive regions 146 and 148. In certain embodiments, the conductive regions 146 and 148 may be made from the same conductive material; while in other embodiments, the conductive regions 146 and 148 may be made from different conductive material having different conductivity or resistivity. The conductive regions 146 and 148 of the brake member embodiment 142 illustrated in FIG. 10 are not isolated or segmented, and as such, may be useful in brake systems that have multiple caliper assemblies 12 and rely on frequency-based solutions to avoid cross-talk. Further, for brake systems having a single caliper assembly 12 the separate conductive regions 146 and 148 of the brake member embodiment 142 may be used for redundancy of the electrical measurement. For example, the electrical sensing device 20 may sense or determine that the caliper assembly 12 has engaged the brake medium 142 if either of the conductive regions 146 or 148 provides a completed electrical circuit. In other embodiments, the electrical sensing device 20 may sense or determine that the caliper assembly has engaged the brake member 142 only if both conductive regions 146 and 148 yield completed electrical circuits. The brake member embodiment 144 illustrated in FIG. 11 includes isolation features 150A, 150B, and 150C, which divide and isolate the conductive region 148 into conductive segments 152A, 152B, and 152C. For brake system embodiments having multiple caliper assemblies, the isolation features 150A-C may prevent cross-talk between different caliper assemblies 12.

Figure 12:
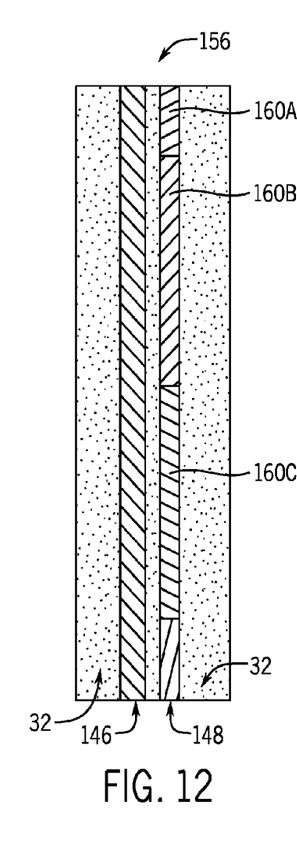
Figure 13:
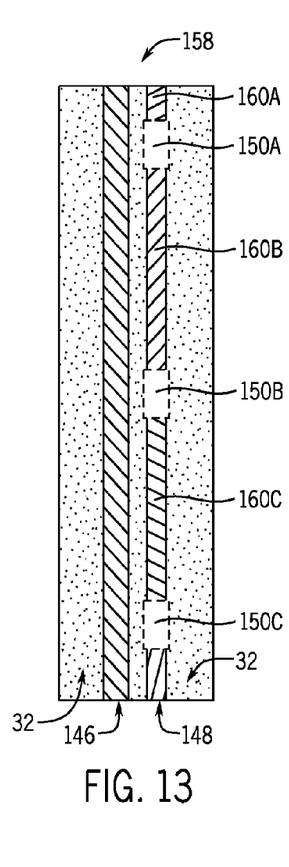

FIGS. 12 and 13 respectively illustrate brake member embodiments 156 and 158, which are examples of brake members having combinations of features from other brake member embodiments discussed above. For example, the brake member embodiment 156 illustrated in FIG. 12 is similar to the brake member embodiment 142 illustrated in FIG. 10; however, for the brake member embodiment 156, the conductive region 148 includes a first portion 160A made from a first conductive material (e.g., steel), a second portion 160B made from a second conductive material (e.g., copper), and a third portion 160C made from a third conductive material (e.g., nickel). The brake member embodiment 158 illustrated in FIG. 13 is similar to the brake member embodiment 156 illustrated in FIG. 12; however, the brake member embodiment 158 includes isolation features 150A-C that divide and isolate the different portions 160A-C of the conductive region 148. As with the brake member embodiments discussed above, the brake member embodiments 156 and 158 may enable the electrical sensing device 20 or the controller 72 to determine with which portion of the brake member 156 or 158 a particular caliper assembly 12 is presently engaged.

Figure 14:
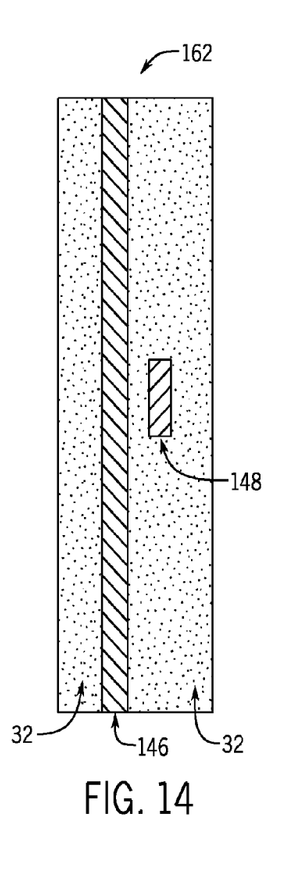
Figure 15:
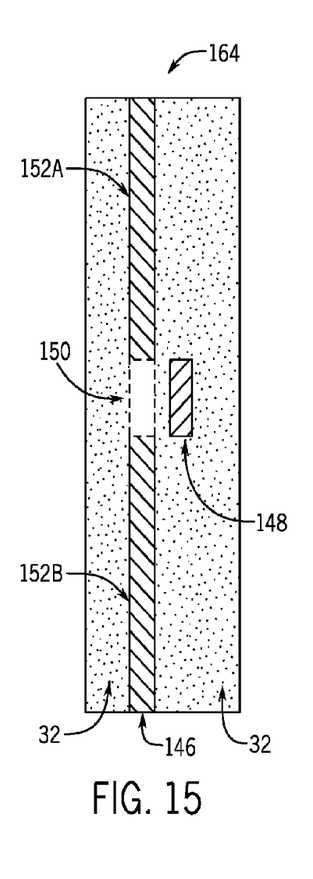

FIGS. 14 and 15 respectively illustrate brake member embodiments 162 and 164, which may be used in combination with certain brake blocks (e.g., brake blocks 108 or 114) such that position of the engaged brake block along the brake member 162 or 164 may be determined by the electrical sensing device 20 and/or the controller 72. Like the brake member embodiments 142, 144, 156, and 158 discussed above, brake member embodiments 162 and 164 include a first conductive region 146. However, in contrast to the embodiments discussed above, the brake member embodiments 162 and 164 respectively illustrated in FIGS. 14 and 15 include a much shorter second conductive region 148. That is, the conductive region 148 of the brake member embodiments 162 and 164 is not a continuous stripe or track for brake members 162 and 164. As such, the conductive region 148 of brake member embodiments 162 and 164 may only provide a conductive path when a conductive region of an engaged pair of brake blocks (e.g., the conductive region 110 of the brake block 108 or the conductive region 116 of the brake block 114) is positioned directly over, and is in electrical contact with, the conductive region 148. Additionally, the brake member 164 illustrated in FIG. 15 also includes an isolation feature 150 that separate a first conductive segment 152A, made from a first conductive material (e.g., steel), from a second conductive segment 152B, made from a second conductive material (e.g., copper).

For example, in certain embodiments, a brake system may include the brake member 162 illustrated in FIG. 14 as well as brake blocks 108 as illustrated in FIG. 6. As such, when the brake blocks 108 are engaged, the electrical sensing device 20 and/or the controller 72 may measure a flow of current (e.g., detect a completed electrical circuit) through the conductive region 146 of the brake member 162, as well as through the conductive regions 112 of the engaged brake blocks 108. However, the electrical sensing device 20 and/or the controller 72 may only measure a flow of current (e.g., detect a second completed electrical circuit) through the conductive region 148 when the conductive regions 110 of the engaged brake blocks 108 are in physical and electrical contact with the conductive region 148. As such, the electrical sensing device and/or the controller 72 may determine a position of the engaged brake blocks 108 relative to the brake member 162. It may be appreciated that this positional information may be useful, for example, for the rotating platform system 60 illustrated in FIG. 3 in order to determine or confirm a position of the platform 64 based on the position of the caliper assemblies 12 relative to the brake member 80. It may also be appreciated that this positional information may allow the controller 72 to determine how well the brake system is performing (e.g., and efficiency of the brake system) and/or if maintenance may need to be performed.

In another example embodiment, a brake system may include the brake member 164 illustrated in FIG. 15 as well as brake blocks 114 as illustrated in FIG. 7. As such, only when the brake blocks 114 are positioned over the conductive region 148, the electrical sensing device 20 and/or the controller 72 may measure a first flow of current (e.g., detect a completed electrical circuit) through the conductive segment 152A of the brake member 162 via the conductive regions 118 of the engaged brake blocks 114. Additionally, the electrical sensing device 20 and/or the controller 72 may measure a second flow of current (e.g., detect a completed electrical circuit) through the conductive segment 152B of the brake member 162 via the conductive regions 120 of the engaged brake blocks 114. Further, the electrical sensing device 20 and/or the controller 72 may measure a third flow of current (e.g., detect a completed electrical circuit) through the conductive region 148 of the brake member 162 via the conductive regions 116 of the engaged brake blocks 114. As such, in certain embodiments, the electrical sensing device 20 and/or the controller 72 may determine a position of the engaged brake blocks 114 relative to the brake member 164 based on more two electrical measurements.

Technical effects of the presently disclosed embodiments include electrically sensing of one or more parameters of a caliper-based brake system during operation. The disclosed brake system embodiments may provide output, such as a measurement signal or a control signal, that indicates whether or not one or more caliper assemblies of the brake system is currently engaged with (e.g., in good contact with) the brake member. In certain embodiments, the disclosed brake system may include a dynamic electrical material to enable the brake system to determine an amount of force applied to the braking medium by the caliper assembly. This may enable the disclosed brake system, or an associated controller, to determine the efficiency of the brake system and/or provide indications that maintenance should be performed on the brake system. Additionally, in certain embodiments, the disclosed brake system may also be able to provide position information (e.g., which portion of the brake member is engaged by the caliper assembly) based on a measured current flow based on the known resistances or conductivities of portions of the brake member. This positional information may be used, for example, to determine the position of an element (e.g., a rotating platform) that is coupled to one or more caliper assemblies or the brake member of the brake system. Furthermore, in certain embodiments, the disclosed brake system may include multiple caliper assemblies. For example, the brake system embodiment may, either alone or in cooperation with a control system, determine whether or not each caliper assembly has engaged the braking member, an amount of force applied by each caliper assembly to the brake member, and/or an engaged position on the brake member for each caliper assembly. As such, the presently disclosed multi-caliper assembly brake system may provide even more positional information than a brake system having a single caliper assembly.

While only certain features of the technique have been illustrated and described herein, many modifications and changes will occur to those skilled in the art. It is, therefore, to be understood that the appended claims are intended to cover all such modifications and changes as fall within the true spirit of the invention.

The invention claimed is:

1. A brake system, comprising:
   a brake member comprising at least one conductive region that extends from a first side of the brake member, through a width of the brake member, to a second side of the brake member, wherein the at least one conductive region comprises a plurality of conductive segments, and wherein each of the plurality of conductive segments have a unique conductivity or resistivity; and
   a caliper assembly positioned about the brake member, wherein the caliper assembly comprises:
   a first brake block disposed along the first side of the brake member;
   a second brake block disposed along the second side of the brake member, wherein the second side is opposite the first side, and wherein the first and second brake blocks are electrically isolated from one another when the first and second brake blocks are disengaged from the brake member;
   an actuator operably coupled to the first brake block, wherein the actuator is configured to move the first brake block toward the second brake block to engage a brake member, and configured to move the first brake block away from the second brake block to disengage the brake member; and
   an electrical sensing device electrically coupled to the first and second brake blocks, wherein the electrical sensing device is configured to perform an electrical measurement between the first and second brake blocks when the first and second brake blocks engage the brake member and form an electrical circuit via the at least one conductive region of the brake member.

2. The brake system of claim 1, wherein the plurality of conductive segments of the brake member are electrically isolated by at least one isolation feature.

3. The brake system of claim 1, wherein the brake member comprises at least one non-conductive area.

4. The brake system of claim 1, wherein the electrical measurement comprises a voltage measurement, a current measurement, a resistance measurement, or a frequency measurement, or a combination thereof.

5. The brake system of claim 1, wherein a portion of the first brake block and a portion of the second brake block that engage the brake member each comprise more than one conductive area.

6. The brake system of claim 5, wherein each of the more than one conductive areas of the first and the second brake blocks is separately in electrical communication with the electrical sensing device, and wherein each of the more than one conductive areas is configured to form separate electrical circuits when the first and second brake blocks engage the brake member.

7. The brake system of claim 1, wherein the caliper assembly comprises a mounting device coupled to the first or second brake blocks, wherein the mounting device is configured to electrically isolate the first or second brake blocks from other portions of the caliper assembly.

8. The brake system of claim 7, wherein the mounting device is configured to interrupt the electrical connection between the first or second brake blocks and the electrical sensing device when a force applied to the mounting device falls below a threshold force.

9. The brake system of claim 7, wherein the mounting device comprises a dynamic electrical material configured to provide a variable resistance or conductance path between the first or second brake blocks and the electrical sensing device based on an amount of force applied to the dynamic electrical material.

10. A method, comprising:
electrifying at least a portion of a first inner surface of a first brake block with a potential;
electrically grounding at least a portion of a second inner surface of a second brake block;
performing an electrical measurement between the first brake block and the second brake block, wherein the electrical measurement comprises a voltage measurement, a current measurement, a resistance measurement, a frequency measurement, or a combination thereof; and
determining the position of the first and second brake blocks relative to a brake member based on the electrical measurement.

11. The method of claim 10, wherein the first brake block is disposed along a first side of the brake member, and wherein the second brake block is disposed along a second side of the brake member opposite the first side, wherein engaging the brake member comprises forming at least one electrical circuit between the first brake block and the second brake block via the brake member.

12. A system, comprising:
a brake system, comprising:
a brake member comprising a conductive region that extends through a width of the brake member to provide a conductive path from a first side of the brake member to a second side of the brake member;
a plurality of caliper assemblies positioned along the brake member, wherein each caliper assembly comprises:
a first brake block comprising a first inner surface oriented along the first side of the brake member;
a second brake block comprising a second inner surface oriented along the second side of the brake member;
an actuator operably coupled to the first brake block, wherein the actuator is configured to move the first brake block toward the second brake block such that the first and second brake blocks engage the brake member when the actuator is actuated by an external stimulus; and
an electrical sensing device electrically coupled to at least a portion of the first inner surface of the first brake block, wherein the electrical sensing device is configured to perform one or more electrical measurements to determine when the first brake block is in contact with the brake member; and
a controller communicatively coupled to the respective electrical sensing devices of each of the plurality of caliper assemblies, wherein the controller is configured to determine whether or not each of the plurality of caliper assemblies is engaged with the brake member and an amount of force applied to the brake member by each of the plurality of caliper assemblies based on the one or more electrical measurement performed by the respective electrical sensing devices of each of the plurality of caliper assemblies.

13. The system of claim 12, wherein the controller is configured to determine a position of each of the plurality of caliper assemblies relative to the brake member based on the one or more electrical measurements performed by the respective electrical sensing devices of each of the plurality of caliper assemblies.

14. The system of claim 12, wherein, for each of the plurality of caliper assemblies, the electrical sensing device is electrically coupled to at least a portion of the second inner surface of the second brake block, and wherein the first and second brake blocks of the plurality of caliper assemblies includes two or more conductive regions, and wherein the brake member includes two or more conductive regions.

15. A caliper assembly, comprising:
a caliper module;
a first brake block mechanically coupled to the caliper module by a first mounting device that electrically isolates the first brake block from the caliper module;
a second brake block mechanically coupled to the caliper module by a second mounting device that electrically isolates the second brake block from the caliper module;
an electrical sensing device configured to perform an electrical measurement between the first and second brake blocks to determine a relative position of the first and second brake blocks, wherein the electrical sensing device is variably electrically coupled to the first brake block via the first mounting device and/or variably electrically coupled to the second brake block via the second mounting device, wherein the first or second mounting device comprises at least one conductive spring element configured to electrically isolate the electrical sensing device from the first or second brake blocks until a threshold force is applied to the first or second mounting device, and wherein the threshold force is determined by a spring force of the at least one conductive spring element.

16. The caliper assembly of claim 15, wherein the first or second mounting device is configured to provide a path between the electrical sensing device and the first or second brake block, wherein the path has a resistance or conductance that is a function of a force applied to the first or second mounting device.

17. The caliper assembly of claim 16, wherein the first or second mounting device comprises a piezoresistive material.

18. A brake system, comprising:
a brake member; and
a caliper assembly positioned about the brake member, wherein the caliper assembly comprises:
a first brake block comprising a first plurality of conductive regions and disposed along a first side of the brake member;
a second brake block comprising a second plurality of conductive regions and disposed along a second side of the brake member, wherein the second side is opposite the first side, wherein the first and second brake blocks are electrically isolated from one another when the first and second brake blocks are disengaged from the brake member, wherein the first and second plurality of conductive regions are configured to form a plurality of separate electrical circuits when the first and second brake blocks engage the brake member;
an actuator operably coupled to the first brake block, wherein the actuator is configured to move the first brake block toward the second brake block to engage a brake member, and configured to move the first brake block away from the second brake block to disengage the brake member; and
an electrical sensing device separately in electrical communication with the first plurality of conductive regions of the first brake block and with the second plurality of conductive regions of the second brake block, wherein the electrical sensing device is configured to perform a respective electrical measurement of each of the plurality of separate electrical circuits formed when the first and second brake blocks engage the brake member.

19. A brake system, comprising:
a brake member; and
a caliper assembly positioned about the brake member, wherein the caliper assembly comprises:
  a first brake block disposed along a first side of the brake member;
  a second brake block disposed along a second side of the brake member, wherein the second side is opposite the first side, and wherein the first and second brake blocks are electrically isolated from one another when the first and second brake blocks are disengaged from the brake member;
  a mounting device coupled to the first brake block or second brake block, wherein the mounting device is configured to electrically isolate the first brake block or the second brake block from other portions of the caliper assembly;
  an actuator operably coupled to the first brake block, wherein the actuator is configured to move the first brake block toward the second brake block to engage a brake member and configured to move the first brake block away from the second brake block to disengage the brake member; and
  an electrical sensing device electrically connected to the first brake block and electrically connected to the second brake block, wherein the electrical sensing device is configured to perform an electrical measurement between the first and second brake blocks when the first and second brake blocks engage the brake member and form an electrical circuit via the brake member, wherein the mounting device comprises a dynamic electrical material configured to provide a variable resistance or variable conductance path between the first brake block or the second brake block and the electrical sensing device based on an amount of force applied to the dynamic electrical material.

20. The brake system of claim 19, wherein the mounting device is coupled to the first brake block and configured to electrically isolate the first brake block from other portions of the caliper assembly, and wherein the dynamic electrical material of the mounting device is configured to provide a variable resistance or variable conductance path between the first brake block and the electrical sensing device.

21. The brake system of claim 19, wherein the mounting device is coupled to the second brake block and configured to electrically isolate the second brake block from other portions of the caliper assembly, and wherein the dynamic electrical material of the mounting device is configured to provide a variable resistance or variable conductance path between the second brake block and the electrical sensing device.

22. A method, comprising:
electrifying at least a portion of a first inner surface of a first brake block with a first potential;
electrifying at least a portion of a second inner surface of a second brake block with a second potential that is different from the first potential, wherein the first potential and the second potential have a matching frequency;
performing an electrical measurement between the first brake block and the second brake block, wherein the electrical measurement comprises a voltage measurement, a current measurement, a resistance measurement, a frequency measurement, or a combination thereof, and frequency filtering to block or subtract electrical signals not having the matching frequency; and
determining the position of the first and second brake blocks relative to a brake member based on the electrical frequency measurement.

* * * * *